(12) United States Patent
Lau

(10) Patent No.: US 11,539,816 B2
(45) Date of Patent: Dec. 27, 2022

(54) DYNAMIC SERVICE RESPONSE

(71) Applicant: T-Mobile USA, Inc., Bellevue, WA (US)

(72) Inventor: Kevin Lau, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/105,305

(22) Filed: Nov. 25, 2020

(65) Prior Publication Data
US 2022/0166852 A1    May 26, 2022

(51) Int. Cl.
*H04L 67/75* (2022.01)
*G06F 11/34* (2006.01)
*H04L 67/56* (2022.01)
*H04L 67/60* (2022.01)

(52) U.S. Cl.
CPC .......... *H04L 67/75* (2022.05); *G06F 11/3409* (2013.01); *H04L 67/56* (2022.05); *H04L 67/60* (2022.05)

(58) Field of Classification Search
CPC ...... G06F 11/3409; H04L 67/28; H04L 67/32; H04L 67/36
See application file for complete search history.

(56) References Cited

U.S. PATENT DOCUMENTS

| | | | |
|---|---|---|---|
| 7,424,666 B2 | 9/2008 | Chandwani et al. | |
| 8,839,032 B2 | 9/2014 | Walton et al. | |
| 9,171,146 B2 | 10/2015 | Vipat et al. | |
| 9,875,121 B2 | 1/2018 | Roth et al. | |
| 10,073,760 B2 | 9/2018 | Golender et al. | |
| 10,592,262 B1* | 3/2020 | Strand | G06F 9/44505 |
| 2021/0173670 A1* | 6/2021 | Borra | G06F 9/44505 |
| 2021/0191634 A1* | 6/2021 | Zafman | G06F 3/067 |

* cited by examiner

*Primary Examiner* — Gil H. Lee
(74) *Attorney, Agent, or Firm* — Han Santos, PLLC

(57) ABSTRACT

Methods, systems, and apparatus, including computer programs encoded on a computer storage medium, for dynamic service response are disclosed. In one aspect, a method includes the actions of receiving a request to access a first computing service. The actions further include, in response to receiving the request to access the computing service, accessing first status data that indicates a first status of the first computing service and second status data that indicates a second status of the first computing service. The actions further include, based on the first status data and the second status data, generating instructions for the first computing service to respond to the request. The actions further include providing the first computing service the instructions for responding to the request.

20 Claims, 4 Drawing Sheets

DYNAMIC SERVICE RESPONSE

BACKGROUND

A computing interface is a shared boundary across which two or more separate components of a computer system exchange information. The exchange can be between software, computer hardware, peripheral devices, or any combination of these. A software interface may refer to different types of interfaces. An operating system may interface with pieces of hardware. Applications or programs running on the operating system may need to interact with each other. An interface may define interactions between applications or programs such as the kinds of calls or requests that can be made, how to make them, the data formats that should be used, the conventions to follow, etc.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

During periods of high demand on a computing system, users may encounter delays that may affect their overall experience with the system. While these delays may be caused, in part, by a high number of users accessing the computing system, the delays may also be a result of the various services of the computing system not being able to dynamically adapt during periods of high demand. To avoid these delays, the computing system may be configured to monitor the statuses of the various computing services. Based on the statuses of the services, the system may provide instructions to some of the services for how to handle future requests. The instructions may provide shortcuts that may affect the accuracy of the services, but allow the services to function with less delay while not detracting from the user experience. In some instances, the tradeoff of accuracy for speed may be made acceptable from the standpoint of user experience.

For example, a telecommunications service provider's website may experience a spike in traffic during certain events where many users are attempting to access the telecommunications service provider's website. Each time a different user attempts to access the website, a server may initiate a request to a computing service. The computing service may include an interface, such as an application programming interface, that receives the request. During a spike in traffic, the computing service may be unable to respond to each request. In this case, the computing service may return an error indicating that the computing service was unable to respond to the request. In turn, the interface may also return an error. These errors may affect the experience of the users who are attempting to access the telecommunications service provider's website. The users may be unable to view, navigate, and/or perform actions on the telecommunications service provider's website. To avoid this, the server may monitor the rate at which the interface of the computing service receives a request, the error rate at which the interface of the computing service returns an error, and the delay that indicates a time period for the interface of the computing service to respond to a request. Based on these parameters, the server may instruct the interface of the computing service to perform a different action in response to a request. This different action may decrease the rate at which the interface returns an error. Decreasing the error rate may allow more users to view, navigate, and/or perform actions on the telecommunications service provider's website.

Figure 1:
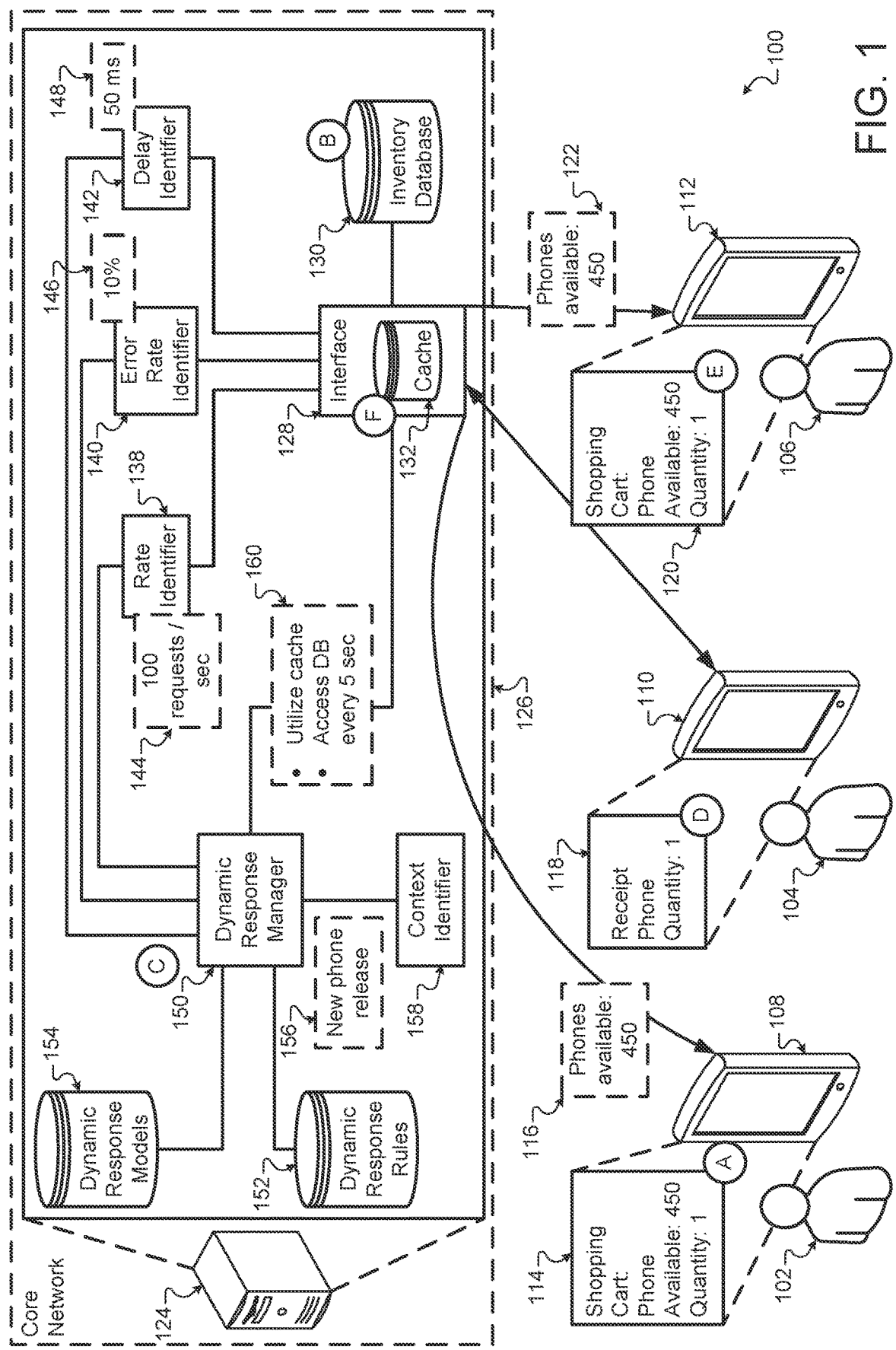
FIG. 1 illustrates an example system for managing the response strategy of a computing service.

FIG. 1 illustrates an example system 100 for managing the response strategy of a computing service. Briefly, and as described in more detail below, multiple users, including user 102, user 104, and user 106 are attempting to perform a similar action on their client device 108, client device 110, and client device 112, respectively. The action may include accessing the same computing service of the network server 124. In addition to the user 102, user 104, and user 106 attempting to perform the same action, other users may be attempting to perform the same action as well. This may degrade the ability of the network server 124 and the computing service to respond in a timely manner and the quality of experience of each user may suffer. To avoid degrading the experiences of the user 102, user 104, user 106, and others, the network server 124 may change how the computing service responds to requests. The network server 124 may monitor the rate 144 at which the computing service receives requests, the error rate 146 of the computing service, and the time 148 it takes the computing service to respond. The network server 124 may also identify the action that the user 102, user 104, user 106, and others are attempting to perform. Based on the characteristics of the action, the request rate 144, the error rate 146, and the response time 148, the network server 124 may adjust how the computing service responds to the requests. This adjustment may improve the quality of the experience of each user even if the accuracy of the computing service decreases.

In the example of FIG. 1, the user 102, user 104, user 106, and others are attempting to purchase a phone. The phone may have recently been offered for sale and many users are attempting to be one of the first ones to purchase the phone. The release of a new phone may be an example of an event that causes a spike in different users attempting to access the same website and/or application. For example, this rush to purchase may cause a spike in traffic and request to various websites and/or computing services involved in selling the phone. For example, network server 124 may provide the quantity of phones available as part of the interface provided to the users. The network server 124 may check the inventory database 130 each time a user attempts to access the page where the phone is offered for sale. If there is a spike in traffic because multiple users are attempting to purchase the phone at the same time, the inventory database 130 may become overloaded and not be able to return timely inventory values. Because of this, the inventory interface 128 may return an error that indicates that the inventory interface 128 is unable to provide a valid response to an inventory request or the inventory interface 128 may be unresponsive. This may result in some users not being able to purchase the phone.

To address this problem, the network server 124 may monitor the request rate 144, the error rate 146, and the response time 148 of the inventory interface 128. The network server 124 may determine context data 156 that reflects the context of the interactions between the user 102, user 104, and user 106 and the network server 124. Based on the context data 156, the request rate 144, the error rate 146, and the response time 148, the network server 124 may include a dynamic response manager 150 that instructs the inventory interface 128 to access the cache 132 when the inventory interface 128 receives a request for the current inventory. The instructions may also include that the inventory interface 128 should update the inventory value in the cache 132 periodically, such as every five seconds. Doing so will allow the inventory interface 128 to return an inventory value that is accurate enough because most users may be purchasing just one phone. If the inventory value decreases below a threshold, then the inventory interface 128 may update the cache 132 more frequently. With a decrease in the error rate of the inventory interface 128, the reliability of the shopping interface may improve, and more users may be able to purchase phones.

In more detail and in stage A, the user 102 is attempting to purchase a phone using the client device 108. As part of the purchase process, the user 102 navigates to a shopping website and selects the phone to add it to the shopping cart of the user 102. The user 102 may view the contents of the shopping cart on the shopping cart page 114 before checking out. As part of the process of displaying the contents of the shopping cart, the dynamic response manager 150 may request that the inventory interface 128 provide a current number of phones in the inventory. In stage B, the inventory interface 128 may access the inventory database 130 and return the inventory value 116 indicating that four-hundred fifty phones remain. In some instances, the network server 124 may include the inventory value 116 on the shopping cart page 114.

With the spike in requests to the inventory interface 128 caused by the many users who are attempting to purchase phones at the same time, the inventory interface 128 may attempt to access the inventory database 130 more often than the inventory database 130 is capable of returning an inventory value. This may cause the inventory interface 128 to return errors in response to some of the requests. For example, the inventory database 130 may be capable of returning inventory values ten inventory values each second. If the inventory database 130 receives more than ten requests for inventory values within a second, then the inventory database 130 may return an error to one or more of those requests. The error may indicate that the inventory database 130 was unable to return an inventory value.

To assist the inventory interface 128 in being able to respond to the increase in requests and in stage C, the dynamic response manager 150 may provide instructions 160 to the inventory interface 128 to return cached inventory values and request an updated inventory number from the inventory database 130 at periodic intervals, such as every five seconds. The instructions 160 may be based on a number of different factors such as the rate 144 at which the inventory interface 128 receives requests, the error rate 146 of the inventory interface 128, and the time 148 it takes the inventory interface 128 to respond.

The network server 124 may include a rate identifier 138 that is configured to determine the request rate 144 of the inventory interface 128. The rate identifier 138 may monitor the number of requests that the inventory interface 128 receives. The rate identifier 138 may determine the number of requests per unit of time that the inventor interface 128 receives and provide the request rate 144 to the dynamic response manager 150. In the example of FIG. 1, the request rate 144 is one hundred requests per second. The rate identifier 138 may provide the request rate 144 to the dynamic response manager 150 at periodic intervals and/or if the request rate 144 changes by at least a threshold amount.

The network server 124 may include an error rate identifier 140 that is configured to determine the error rate 146 of the inventory interface 128. The error rate identifier 140 may monitor the number of errors that the inventory interface 128 outputs relative to the number of total outputs of the inventory interface 128. The error rate identifier 140 may determine a percentage of the number of error outputs to the total number of outputs. In the example of FIG. 1, the error rate 146 is ten percent. The error rate identifier 140 may provide the error rate 146 to the dynamic response manager 150 at periodic intervals and/or if the error rate 146 changes by at least a threshold amount.

The network server 124 may include a delay identifier 142 that is configured to determine the time 148 that the inventory interface 128 takes to respond to a request. The response from the inventory interface 128 may include valid responses that include an inventory value from the inventory database 130, errors, and any other type of response from the inventory interface 128. In some implementations, the delay identifier 142 may determine the average response time over a previous number of requests, such as the last hundred requests. In some implementations, the delay identifier 142 may output the response time 148 of the previous requests. In the example of FIG. 1, the response time 148 is fifty milliseconds. The delay identifier 142 may provide the response time 148 at periodic intervals and/or if the response time 148 changed by at least a threshold amount.

The dynamic response manager 150 may receive the request rate 144, the error rate 146, and the response time 148. The dynamic response manager 150 may also receive context data 156 from the context identifier 158. The context identifier 158 may determine the context surrounding the interactions between the user 102, the user 104, the user 106, and other users and the network server 124. The context identifier 158 may analyze the data exchanged between the client device 108, the client device 110, and the client device 112 and the network server 158. The data may include data identifying the network server 158 such as the owner and/or operator of the network server 158 and/or keywords and terms included in the data. The data may also include the location of the client devices, the date and time, and/or the location of the network server 158. The context identifier 158 may determine that a large portion of the users are attempting to access the same website. The context identifier 158 may access current news data that may reveal current events such as new product releases, sporting events, weather events, natural disasters, or any other type of event where people may perform a similar action with the network server 124. In this case, the context identifier 158 may access news data that indicates that a new phone model was recently released. The context identifier 158 may determine that the spike in traffic coincided with the time the new phone model was available for purchase.

In the example of FIG. 1, the context identifier 158 may analyze the data exchanged between the client device 108, the client device 110, and the client device 112 and the network server 124. The data may include data identifying the operator of the network server 124 as a telecommunications provider and may include terms such as "phone," "shopping cart," and "now available." The context identifier 158 may determine that the client device 108, the client device 110, and the client device 112 are each accessing the same phone shopping webpage. The attempts to access the same phone shopping webpage may be magnitudes larger than the typical traffic to that phone shopping webpage. The context identifier 158 may also receive current news information. The current news information may indicate that a new phone just became available for purchase. Based on those pieces of information and any additional factors, the context identifier 158 may determine that the user 102, the user 104, the user 106, and other users accessing the same phone shopping webpage are attempting to purchase the new phone.

With the context identifier 158 determining the likely current context, the context identifier 158 may also analyze historical information to further refine the current context. The historical data may provide information related to past users who were performing the same action as the current users. The historical data may also include data related to the past users' interactions with the network server 124, such as where the devices of the users were located when interacting with the network server 124, the words and terms included in the data exchanged between the devices of the users and the network server 124, data identifying other servers the devices communicated with and the owners/operators of those servers, and other similar information. Based on the actions of the past users, the context identifier 158 may identifier likely actions of current users. For example, the context identifier 158 may determine that users who accesses the phone shopping webpage and completed a purchase, purchased an average of 1.1 phones. Based on the historical purchase data, the context identifier 158 may determine that the user 102, the user 104, the user 106, and other users accessing the same phone shopping webpage will likely purchase about one phone.

The dynamic response manager 150 analyzes the request rate 144, the error rate 146, the response time 148, and the context data 156 to determine the response instructions 160 and generate the response instructions 160. The dynamic response manager 150 may be implemented by the network server 124 that is included in a wireless carrier network that provides voice and data communication services to multiple client devices, such as the client device 108, the client device 110, the client device 112, and other similar devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), 5th Generation (5G) wireless systems, CDMA-2000 (Code Division Multiple Access 2000), and/or other similar standards.

The wireless carrier network may include a radio access network and a core network 126. The radio access network may include multiple base stations. The multiple base stations are responsible for handling voice and data traffic between multiple client devices, such as the client device 108, the client device 110, the client device 112, and other similar devices. Accordingly, each of the base stations may provide a corresponding network cell that delivers telecommunication and data communication coverage. The core network 126 may use the network cells to provide communication services to the multiple subscriber devices. For example, the core network 126 may connect the multiple subscriber devices to other telecommunication and data communication networks, such as the Internet and the public switched telephone network (PSTN). The base stations are responsible handling voice and data traffic between user devices and the core network 126. In some implementations, the base stations may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area that is referred to as a "cell." The BTS may send RF signals to user devices and receive radio signals from subscriber devices.

The dynamic response manager 150 may access the dynamic response models 154 and/or the dynamic response rules 152 when analyzing the request rate 144, the error rate 146, the response time 148, and the context data 156. The dynamic response rules 152 may indicate how to compare the request rate 144, the error rate 146, the response time 148, and the context data 156. Based on that comparison, a rule may specify a response instruction. The dynamic response rules 152 may be predetermined and may be based on adjustments to the inventory interface 128 and other services that are likely to preserve the user experience while also allowing the inventory interface 128 and the other services to respond to more requests. In some instances, a response instruction may not improve the accuracy of the output of the inventory interface 128, but that decrease in accuracy may not decrease the quality of the user's experience.

Some rules may include ranges and/or thresholds for each of the request rate 144, the error rate 146, and the response time 148. Based on how the request rate 144, the error rate 146, and the response time 148 compare to the ranges and/or thresholds, the rule may specify what instruction to provide to the inventory interface 128. For example, if the error rate 146 is below an error rate threshold and the response time 148 is below a threshold response time, then the rule may specify for the inventory interface 128 to perform as usual. This rule may be independent of the request rate 144.

As another example, if the request rate 144 is below a response rate threshold, the error rate 146 is above an error rate threshold, and the response time 148 is below a delay threshold, then the rule may specify for the inventory interface 128 to return a value from the cache 132, restart the inventory database 130, and attempt to request an updated inventory value from the inventory database 130 after a specific period of time. As another example, if the request rate 144 is below a response rate threshold, the error rate 146 is below an error rate threshold, and the response time 148 is above a delay threshold, then the rule may specify for the inventory interface 128 to return a value from the cache 132 and attempt to request an updated inventory value from the inventory database 130 after a specific period of time.

As another example, if the request rate 144 is above a response rate threshold, the error rate 146 is above an error rate threshold, and the response time 148 is below a delay threshold, then the rule may specify for the inventory interface 128 to return a value from the cache 132, restart the inventory database 130, and attempt to request an updated inventory value from the inventory database 130 after a specific period of time. As another example, if the request rate 144 is above a response rate threshold, the error rate 146 is below an error rate threshold, and the response time 148 is above a delay threshold, then the rule may specify for the inventory interface 128 to refresh the cache 132 by refreshing the cache 132 by requesting an updated inventory value from the inventory database 130, return the value from the cache 132, and continue to return the value from the cache 132 until the response time 148 is below a delay threshold.

The dynamic response manager 150 may also use the dynamic response models 154 that are configured to receive the request rate 144, the error rate 146, the response time 148, and the context data 156 and output data indicating an instruction 160 for the dynamic response manager 150 to provide to the inventory interface 128. The dynamic response models 154 may be trained using historical data and machine learning. The historical data may include multiple data samples that each include a request rate, an error rate, a response time, whether the inventory interface 128 returned the value from the cache 132, and/or the context data. The data samples may be collected from the network server 124, other network servers, and other computing systems that include interfaces that are capable of accessing a cached value.

The network server 124 may train the dynamic response models 154 using machine learning and the historical data. The network server 124 may train multiple models that are each configured to receive different types of data. For example, a group of data samples may include data indicating whether the inventory interface 128 returned the value from the cache 132 or from the inventory database 130. Those data samples may also include a request rate, an error rate, a response time, and context data. The resulting model may be configured to receive a request rate, an error rate, a response time, and context data and output data indicating whether to instruct the inventory interface 128 to return a value from the cache 132 or from the inventory database 130.

As another example, a group of data samples may include a request rate, an error rate, a response time, and data indicating whether the inventory interface 128 returned the value from the cache 132 or from the inventory database 130. The resulting model may be configured to receive a request rate, an error rate, and a response time and output data indicating whether to instruct the inventory interface 128 to return a value from the cache 132 or from the inventory database 130. Other groups of data samples may include data in place of the data indicating whether the inventory interface 128 returned the value from the cache 132 or from the inventory database 130. The model trainer may use those groups of data samples to train models that are configured to provide instructions for other interfaces.

The dynamic response manager 150 may use a combination of the dynamic response models 154 and the dynamic response rules 152 to determine the instructions 160. In some implementations, the dynamic response manager 150 may provide the request rate 144, the error rate 146, the response time 148, and the context data 156 to a model from the dynamic response models 154 and receive candidate instructions from the model. The dynamic response manager 150 may then apply the request rate 144, the error rate 146, the response time 148, and the context data 156 to the dynamic response rules 152. If the rules indicate that any aspect of the candidate instructions should be changed, then the dynamic response manager 150 may override the instructions and provide them to the inventory interface 128. A rule may override candidate instructions received from a model in order to assure a certain outcome or prevent another outcome. Some rules may be temporary in order to assure a certain outcome or prevent another outcome during a particular time period.

In some implementations, the dynamic response models 154 and/or the dynamic response rules 152 may be ranked. The ranking may assist the dynamic response manager 150 in resolving conflicts between instructions from the dynamic response models 154 and/or the dynamic response rules 152. If a higher ranking model or rule provides a different instruction than a lower ranked model or rule, then the dynamic response manger 150 may select the instruction from higher ranked model or rule. In some implementations, the dynamic response manager 150 may initially generate a candidate instruction from the dynamic response models 154. If a rule that is ranked higher than the model generates a different instruction, then the dynamic response manager 150 updates the instruction. If a rule that is ranked lower than the model generates a different instruction, then the dynamic response manager 150 may not update the instruction. In some implementations and if possible, the dynamic response manager 150 may average update times included different instructions. For example, a model may indicate to wait until five seconds to access the inventory database, and a rule may indicate to wait three seconds. The dynamic response manager 150 may average the two values and provide the instruction to wait four seconds between accesses to the inventory interface 128.

In the example of FIG. 1, the dynamic response manager 150 applies the dynamic response models 154 and/or the dynamic response rules 152 to the request rate 144, the error rate 146, the response time 148, and the context data 156. The dynamic response manager 150 generates the instruction 160 indicating that the inventory interface should output the data from the cache 132 and access the inventory database 130 every five seconds.

In stage D, the user 104 completes the purchase of one phone. With this purchase the number of phones in the inventory database 130 decreases by one. Because the inventory interface 128 may be interacting with the inventory database 130, such as every five seconds, the adjustments to the inventory database 130 may be held in a queue. The inventory interface 128 may update the inventory database 130 based on the adjustments in the queue when the inventory interface 128 updates The actions of the user 102, the user 104, the user 106, and other users may occur at approximately the same time while inventory interface 128 first provides the inventory data 116 for the shopping cart page 114 that is viewed by user 102, then receives data indicating that the user 104 purchased a phone, and then provides the inventory data 122 for the shopping cart page 120 that is viewed by user 106. In this case, the inventory interface 128 may respond to the request generated based on the user 106 adding the phone to the shopping cart of the user 106 after receiving the change in the inventory based on the user 104 completing the purchase and/or after updating the inventory database 130 based on the user 104 completing the purchase.

In stage E, the user 106 is interacting with the client device 112 and accessing the shopping page to purchase one of the new phones. The user 106 adds the phone to the shopping cart of the user 106. The user 106 navigates to the shopping cart page 120 and the network server 124 requests that the inventory interface 128 return the inventory value for the phones. The inventory interface 128 recently received the instructions 160 indicating to return an inventory value from the cache 132 and access the inventory database 130 every five seconds. In stage F, the inventory interface 128 accesses the cache and returns the value 122 indicating that four hundred-fifty phones are available. The network server 126 includes that inventory number 122 in the shopping cart page 120, and the client device 112 presents the shopping cart page 120.

The user 106 is able to complete the purchase of the phone even with the inventory interface 128 receiving a spike in traffic because of the new phone release. Without the dynamic response manager 150 providing instructions 160 to the inventory interface 128, the inventory interface 128 may not be able to respond to the sharp increase in requests that result from the spike in users accessing the phone shopping page. Because the dynamic response manager 150 instructed the inventory interface 128 to limit the requests made to the inventory database 130, more users are able to be some of the first to purchase the new phone.

Figure 2:
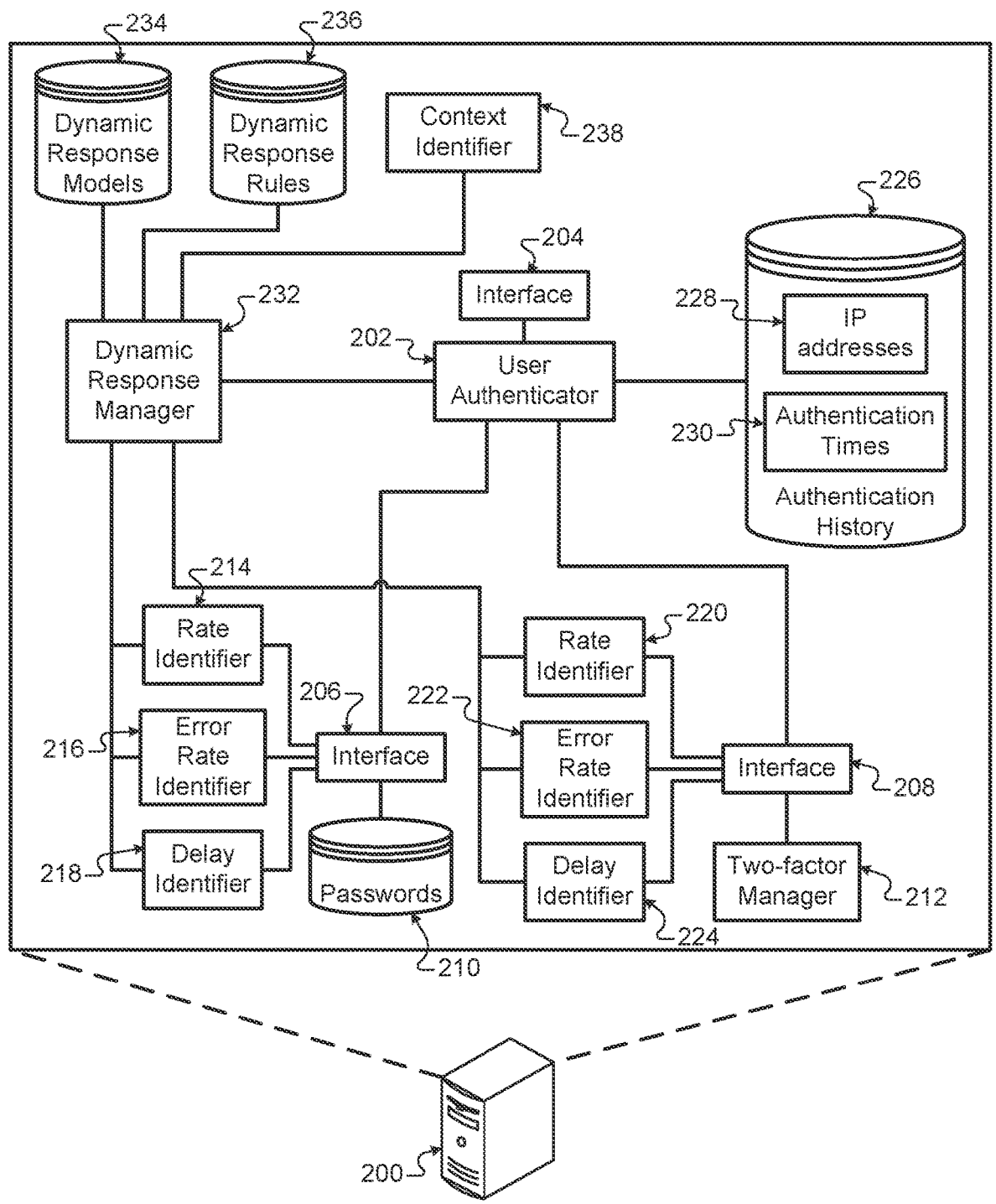
FIG. 2 illustrates an example server for managing the response strategies of multiple computing services.

FIG. 2 illustrates an example server 200 for managing the response strategies of multiple computing services. The server 200 may be any type of computing device that is configured to be integrated into a wireless carrier network or interact with a wireless carrier network. For example, the server 200 may be similar to the network server 124 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a user authenticator 202 that is configured to receive login data from users of various client devices and authenticate each user. The user authenticator 202 may access various computing services to authenticate a user. The authentication process may involve the user entering a username and a password. The user may then receive a code in an SMS message and have to provide that code to the server 200. If the username, password, and code match, then the user authenticator 202 may authenticate the user.

For example, some of the computing services that the user authenticator 202 may interact with to authenticate a user include the password database 210 and the two-factor manager 212. The password database 210 may be configured to receive a username and password from the user authenticator 202. The username and password may be a username and password that a user provided. The password database 210 may compare the received password to the stored password associated with that username in the password database 2010. The password database 210 may output data indicating whether the received password matched the stored password for that username. If the received password matches the stored password, then the password database 210 may authenticate the user. Correspondingly, the two-factor manager 212 may be configured to receive data indicating a username of a user. The two-factor manager 212 may identify the phone number that corresponds to that username and request that a code be transmitted to that phone number through an SMS message. The two-factor manager 212 may access a storage device that includes relates usernames to phone numbers. The two-factor manager 212 may then receive a code from the user authenticator 212. Based on the comparison between the received code and the code sent in an SMS message, the two-factor manager 212 may determine whether to authenticate the user. The user authenticator 202 may authenticate the user if both the password database 210 and the two-factor manager 212 authenticate the user.

The user authenticator 202 may store authentication data in the authentication history 226. The authentication history 226 may include a record of the previous authentications performed by the user authenticator 202. The data included in the authentication history 226 may include the IP addresses 228 of the device when the user authenticator 202 authenticated the user. The data included in the authentication history 226 may also include the authentication times 230 that indicates when the user authenticator 202 previously authenticated the user. For example, for a user Alice, the IP addresses 228 may indicate that Alice previously logged in from IP address 87.231.45.33, and the time that Alice logged in was 1:00 pm on Aug. 1, 2020.

The user authenticator 202, the password database 210, and the two-factor manager 212 may each include an interface. The user authenticator 202 may provide a username and password pair to the password database interface 206 and a request for the password database 210 to determine whether the password matches the stored password for that user. The user authenticator 202 may provide a username to the two-factor manager interface 208 and a request for the two-factor manager 212 to confirm the identity of the user using SMS. The user authenticator 206 may also include a user authenticator interface 204 that is configured to receive authentication requests.

In some instances, the user authenticator interface 204 may receive a spike in requests to authenticate multiple users. This spike may be because multiple users may be attempting to login to a shopping website to purchase a new phone that was just released, or because multiple users may be attempting to login to their email accounts to send an email to claim a free gift at a specific time. The event that may be the cause of the spike may be the release of a new phone, or the event may be the offer of a free gift. Each of these situations may cause the user authenticator 202 to make a sharp increase in the number of requests to the password database interface 206 and the two-factor manager interface 208. This sharp increase may case some of the password database 210 and/or the two-factor manager 212 to return errors, which may prevent the users from logging in to the application that the users are attempting to access.

The server 200 includes a dynamic response manager 232 that is configured to provide instructions to the user authenticator 202 regarding the handling of authentication requests. In the typical situation, the dynamic response manager 232 may instruct the user authenticator 202 to receive a username, password, and authentication request through the user authenticator interface 204. The instructions may indicate for the user authenticator 202 to provide the username, password, and a request to verify that the password matches the stored password for the username in the passwords database 210. The instructions may also indicate for the user authenticator 202 to provide the username and a request to confirm that the user is able to return a code sent in an SMS message.

The dynamic response manager 232 may receive data from various identifiers that are configured to monitor the request rate, error rate, and response time of the password database interface 206 and the two-factor manager interface 208. For the password database interface 206, the rate identifier 214 may be configured to determine the request rate that indicates the number of password authentication and/or other requests that the password database interface 206 receives in a unit of time. The error rate identifier 216 may be configured to determine the error rate that indicates the frequency that the password database interface 206 outputs an error relative to the number of requests that the password database interface 206 receives. The delay identifier 218 may be configured to determine the response time that indicates time that the password database interface 206 takes to return a response after receiving a request.

For the two-factor manager interface 208, the rate identifier 220 may be configured to determine the request rate that indicates the number of SMS confirmation requests and/or other requests that the two-factor manager interface 208 receives in a unit of time. The error rate identifier 222 may be configured to determine the error rate that indicates the frequency that the two-factor manager interface 208 outputs an error relative to the number of requests that the two-factor manager interface 208 receives. The delay identifier 224 may be configured to determine the response time that indicates time that the two-factor manager interface 208 takes to return a response after receiving a request.

The dynamic response manager 232 may also receive context data from the context identifier 238. The context identifier 238 may determine the context surrounding the interactions from various client devices and the user authenticator interface 204. The context identifier 238 may analyze the network traffic of the client devices and other client devices. The context identifier 238 may determine that a large portion of the users are attempting to access the same website. The context identifier 238 may analyze the contents of that website to determine the current context. The context identifier 238 may access current news data that may reveal current events such as new product releases, sporting events, weather events, natural disasters, or any other type of event where people may perform on a client device.

For example, users may be attempting to log in to a shopping website to purchase a new phone. The context identifier 238 may determine, based on analyzing the current news data, that a new phone would be available for sale at a certain time. The context identifier 238 may identify keywords from websites of various news providers. The context identifier 238 identify the current events based on the keywords that appear on several of the news providers websites. The context identifier 238 may provide context data to the dynamic response manager 232 indicating there is likely an increase in users attempting to purchase the new phone model. As another example, users may be attempting to log in to an email application to claim a prize. The context identifier 238 may determine, based on analyzing current news data, that users can claim a prize by being some of the first to send, after a specified time, an email to the entity offering the prize. The context identifier 238 may provide context data to the dynamic response manager 232 indicating that there is likely an increase in users attempting to log in to their email application to send an email to claim a prize.

The dynamic response manager 232 may access the dynamic response models 234 and/or the dynamic response rules 236 when analyzing the request rates, the error rates, the response times, and the context data. The dynamic response rules 236 may indicate how to compare the request rates, the error rates, the response times, and the context data. Based on that comparison, a rule may specify a response instruction. The dynamic response rules 236 may be predetermined and may be based on adjustments to the user authenticator 202 that are likely to preserve the user experience while also allowing the user authenticator 202 and the other services to respond to more requests. In some instances, a response instruction may not increase the ability of the user authenticator 202 to authenticate more users, but that lack of increase may translate into an increase of the quality of the users' experiences.

Some rules may include ranges and/or thresholds for each of the request rates, the error rates, and/or the response times. Based on how the request rates, the error rates, and/or the response times compare to the ranges and/or thresholds, the rule may specify what instruction to provide to the user authenticator 202. For example, if the error rates are below error rate thresholds and the response times are below threshold response times, then the rule may specify for the user authenticator 202 to perform as usual. This rule may be independent of the request rates.

As another example, if the request rates are below response rate thresholds, the error rates are above error rate thresholds, the response times are below delay thresholds, and the context data indicates that the users are attempting to access a shopping webpage, then the rule may specify for the user authenticator 202 to attempt to authenticate some users using the authentication history 226 for a specific period of time. The rule may also specify to restart the password database interface 206 and/or the two-factor manager interface 208.

The user authenticator 202 may use the authentication history 226 to authenticate users instead of accessing the password database interface 206 and/or the two-factor manager interface 208. As part of the authentication process, the user authenticator interface 204 may receive a username, password, and IP address of the device from which the user is attempting to log in. The user authenticator 202 may access the stored IP addresses 228 and compare the received IP address to the previous IP address from which the user logged in. The user authenticator 202 may access the stored authentication times 230 to determine the last time that the user logged in. If the two IP addresses match and the time between the current time and the last log in of the user is within a threshold time period, then the user authenticator 202 may authenticate the user without accessing the password database interface 206 and/or the two-factor manager interface 208.

As another example, if the request rates are below response rate thresholds, the error rates are above error rate thresholds, the response times are below delay thresholds, and the context data indicates that the users are attempting to access an email application, then the rule may specify for the user authenticator 202 to restart the password database interface 206 and/or the two-factor manager interface 208 and then perform as usual. In these two examples, dynamic response manager 232 may determine how to instruct the user authenticator 202 based on the context data. The context data in the first example may indicate that the users are attempting to access a shopping page. The context data in the second example may indicate that the users are attempting to access an email application. Because unauthorized purchases on a user's account may coincide with more phone sales overall, a recoverably small number of unauthorized purchases may be tolerated. However, allowing unauthorized users access to an email account may not coincide with any benefit to the entity offering the email service. Security may be more important than limiting inconveniences to the users related to accessing the email application.

The dynamic response manager 232 may also use the dynamic response models 234 that are configured to receive the request rates, the error rates, the response times, and the context data and output data indicating an instruction for the dynamic response manager 232 to provide to the user authenticator 202. The dynamic response models 234 may be trained using historical data and machine learning. The historical data may include multiple data samples that include request rates, error rates, response times, whether the user authenticator 202 was authenticating users using the authentication history or using the password database interface 206 and/or the two-factor manager interface 208, and/or the context data. The data samples may be collected from the server 200 and other servers and computing systems that are configured to authenticate users.

The server 200 may train the dynamic response models 234 using machine learning and the historical data. The server 200 may train multiple models that are each configured to receive different types of data. For example, a group of data samples may include data indicating whether the user authenticator 202 was authenticating users using the authentication history or using the password database interface 206 and/or the two-factor manager interface 208. Those data samples may also include request rates, error rates, and response times of the password database interface 206 and the two-factor manager interface 208 and context data. The resulting model may be configured to receive request rates, error rates, and response times of the password database interface 206 and the two-factor manager interface 208 and context data and output data indicating whether to instruct the user authenticator 202 to authenticate users using the authentication history 226 or using the password database interface 206 and/or the two-factor manager interface 208.

As another example, a group of data samples may include a request rate, an error rate, and a response time of the password database interface 206, context data, and data indicating whether the user authenticator 202 was authenticating users using the authentication history or using the password database interface 206. The resulting model may be configured to receive a request rate, an error rate, and a response time of the password database interface 206 and context data and output data indicating whether to instruct the user authenticator 202 to authenticate users using the authentication history or the password database interface 206.

The dynamic response manager 232 may use a combination of the dynamic response models 234 and the dynamic response rules 236 to determine the instructions to provide to the user authenticator 202. In some implementations, the dynamic response manager 232 may provide the request rates, the error rates, the response times, and the context data to a model from the dynamic response models 234 and receive candidate instructions from the model. The dynamic response manager 232 may then apply the request rates, the error rates, the response times, and the context data to the dynamic response rules 236. If the rules indicate that any aspect of the candidate instructions should be changed, then the dynamic response manager 232 may update the instructions and provide them to the user authenticator 202.

In some implementations, the dynamic response models 234 and/or the dynamic response rules 236 may be ranked. The ranking may assist the dynamic response manager 232 in resolving conflicts between instructions from the dynamic response models 234 and/or the dynamic response rules 236. If a higher ranking model or rule provides a different instruction than a lower ranked model or rule, then the dynamic response manager 232 may select the instruction from the higher ranked model or rule. In some implementations, the dynamic response manager 232 may initially generate a candidate instruction from the dynamic response models 232. If a rule that is ranked higher than the model generates a different instruction, then the dynamic response manager 232 updates the instruction. If a rule that is ranked lower than the model generates a different instruction, then the dynamic response manager 232 may not update the instruction. In some implementations and if possible, the dynamic response manager 232 may average or combine different instructions. For example, a model may indicate to restart the password database interface 206, and a rule may indicate to restart the two-factor manager interface 208. The dynamic response manager 232 may combine the two instructions and output instructions to restart both the password database interface 206 and the two-factor manager interface 208.

The dynamic response manager 232 provides the instructions to the user authenticator 202 and continues to apply the dynamic response models 234 and/or the dynamic response rules 236 to the request rates, the error rates, the response times, and the context data. The dynamic response manager 232 may update the instructions based on changes in the outputs of the dynamic response models 234 and/or the dynamic response rules 236

Figure 3:
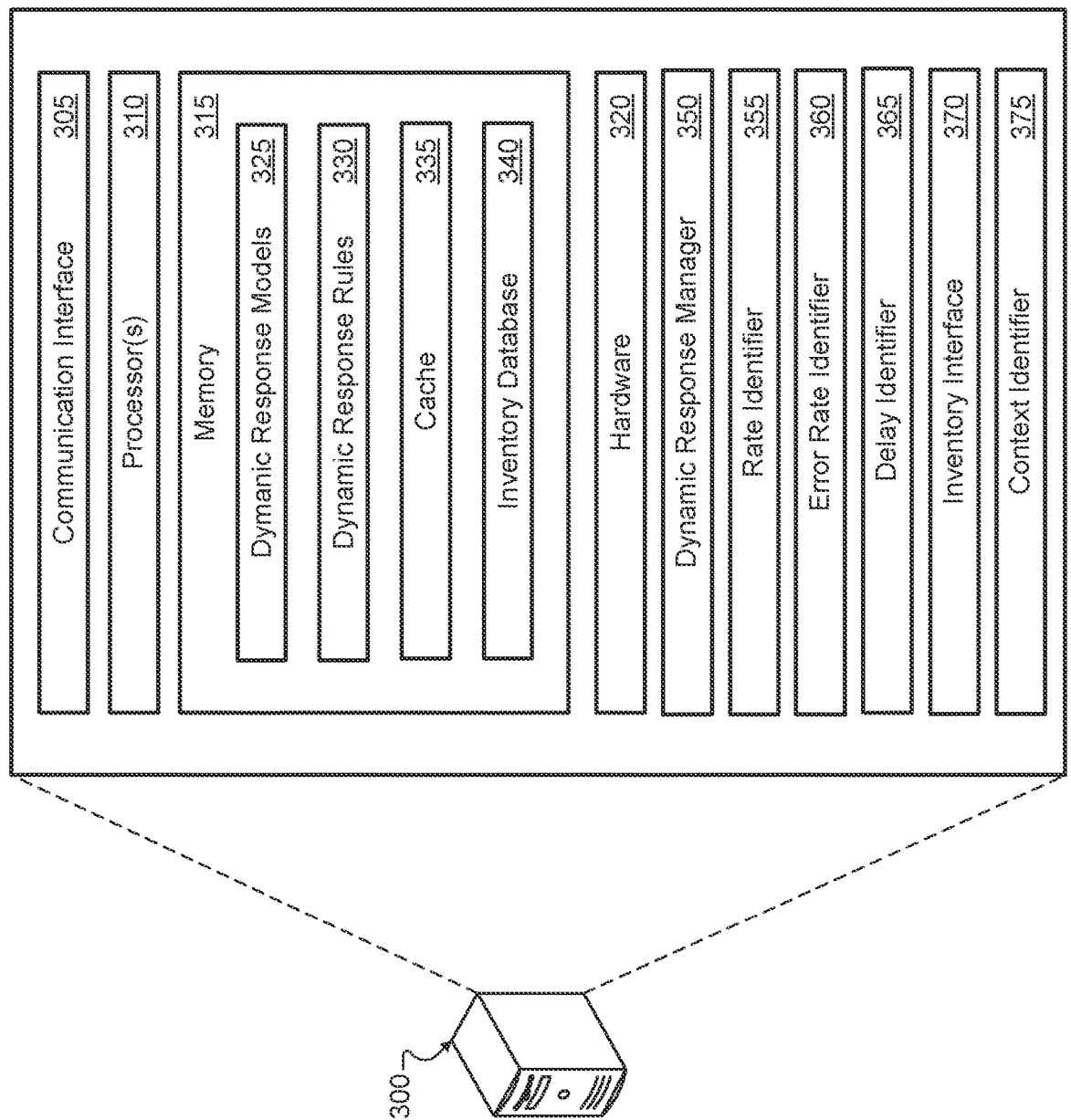
FIG. 3 illustrates an example server for managing the response strategy of a computing service.

FIG. 3 illustrates an example server 300 for managing the response strategy of a computing service. The server 300 may be any type of computing device that is configured to be integrated into a wireless carrier network or interact with a wireless carrier network. For example, the server 300 may be similar to the network server 124 of FIG. 1 or the server 200 of FIG. 2. Some of the components of the server 300 may be implemented in a single computing device or distributed over multiple computing devices. Some of the components may be in the form of virtual machines or software containers that are hosted in a cloud in communication with disaggregated storage devices.

The server 300 may include a communication interface 305, one or more processors 310, memory 315, and hardware 320. The communication interface 305 may include communication components that enable the device 300 to transmit data and receive data from devices connected to the wireless carrier network. The communication interface 305 may include an interface that is configured to communicate with base stations of a wireless carrier network. The communication interface 305 may receive data that other devices transmit to the base stations and/or transmit data to the base stations for transmission to the other devices.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 310 may implement an inventory interface 370. The inventory interface 370 may be similar to the inventory interface 128 of FIG. 1. The inventory interface 370 may interface with the inventory database 340 that may be similar to the inventory database 130 of FIG. 1. The inventory interface 370 may serve a similar function as the password database interface 206 does with the password database 210 and as the two-factor manager interface 208 does with the two-factor manager 212 of FIG. 2. The inventory interface 370 may be configured to receive requests to access and/or update the inventory database 340. For example, the inventory interface 370 may receive a request for the inventory value of phones. The inventory interface 370 may request that the inventory database 340 provide the current inventory value of phones. The inventory interface 370 receives the current inventory value of phones and provides that inventory to the module or device that provided the request.

The one or more processors 310 may implement a rate identifier 355, an error rate identifier 360, and a delay identifier 365. The rate identifier 355 may be similar to the rate identifier 138 of FIG. 1 and may provide functionality similar to the rate identifier 214 and the rate identifier 220 of FIG. 2. The error rate identifier 360 may be similar to the error rate identifier 140 of FIG. 1 and may provide functionality similar to the error rate identifier 216 and the error rate identifier 222 of FIG. 2. The delay identifier 365 may be similar to the delay identifier 142 of FIG. 1 and may provide functionality similar to the delay identifier 218 and the delay identifier 224 of FIG. 2.

The rate identifier 360 may be configured to determine the request rate of the inventory interface 370. The rate identifier 360 may monitor the number of requests that the inventory interface 370 receives. The rate identifier 360 may determine the number of requests per unit of time that the inventory interface 370 receives. For example, the request rate is one hundred requests per second received by the inventory interface 370.

The error rate identifier 365 may be configured to determine the error rate of the inventory interface 370. The error rate identifier 365 may monitor the number of errors that the inventory interface 370 outputs relative to the number of total outputs of the inventory interface 370 or the total number of requests received by the inventory interface. The error rate identifier 365 may determine a percentage of the number of error outputs to the total number of outputs or requests. For example, the error rate may be ten percent, which indicates that for each ten requests that the inventory interface 370 receives, the inventory interface 370 outputs an error about one time.

The delay identifier 365 may be configured to determine the time that the inventory interface 370 takes to respond to a request. The response from the inventory interface 370 may include valid responses that include an inventory value from the inventory database 340, errors, and any other types of response from the inventory interface 370. In some implementations, the delay identifier 365 may determine the average response time over a previous number of requests, such as the last hundred requests. In some implementations, the delay identifier 365 may output the response time of the previous request. For example, the response time may be fifty milliseconds.

The one or more processors 310 may implement a context identifier 375. The context identifier 375 may be similar to the context identifier 158 of FIG. 1 and/or the context identifier 238 of FIG. 2. The context identifier 375 may determine the context surrounding the interactions between users and the server 300. The context identifier 375 may analyze the data exchanged between client devices of the users and the server 300. The context identifier 375 may determine that a large portion of the users are attempting to access the same website or other type of network resource. The context identifier 375 may access current news data that may reveal current events such as new product releases, sporting events, weather events, natural disasters, or any other type of event where people may perform a similar action with the server 300.

In some instances, the inventory interface 370 may receive a spike in requests, and the inventory interface 370 may provide those requests to the inventory database 340. The inventory database 340 may not be able to keep up with the spike in requests and may begin to return errors. The inventory interface 370 may return errors in response to the requests to the inventory database 340. These errors may indicate that the inventory interface 370 is unable to output an inventory value. This may cause users whose devices are interacting with the server 300 to experience errors such as being unable to load a webpage, add an item to a shopping cart, and/or other user actions. In order to reduce the number of errors returned by the inventory interface 370, the one or more processors 310 may implement a dynamic response manager 350. The dynamic response manager 350 may be similar to the dynamic response manager 150 of FIG. 1 and/or the dynamic response manager 232 of FIG. 2. The dynamic response manager 350 may provide instructions to the inventory interface 370 regarding adjusting to the requests. These adjustments may allow the inventory interface 370 to return an approximate inventory value instead of an error and thereby prevent the users from experiencing errors.

The dynamic response manager 350 receives the request rate from the rate identifier 355, the error rate from the error rate identifier 360, the response time from the delay identifier 365, and the context data from the context identifier 375. The dynamic response manager applies the dynamic response models 325 and/or the dynamic response rules 335 to that data to determine the adjustments for the inventory interface 370.

The dynamic response rules 330 may indicate how to compare the request rate, the error rate, the response time, and the context data. Based on that comparison, a rule may specify a response instruction for the dynamic response manager 350 to provide to the inventory interface 370. The dynamic response rules 330 may be predetermined and may be based on adjustments to the inventory interface 370 and other services that are likely to preserve the user experience while also allowing the inventory interface 370 and the other services to respond to more requests. In some instances, a response instruction may not improve the accuracy of the output of the inventory interface 370, but that decrease in accuracy may not decrease the quality of the user's experience.

Some rules may include ranges and/or thresholds for each of the request rate, the error rate, and the response time. Based on how the request rate, the error rate, and the response time compare to the ranges and/or thresholds, the rule may specify what instruction to provide to the inventory interface 370. For example, if the error rate is below an error rate threshold and the response time is below a threshold response time, then the rule may specify for the inventory interface 370 to perform as usual. This rule may be independent of the request rate.

As another example, if the request rate is below a response rate threshold, the error rate is above an error rate threshold, the response time is below a delay threshold, and the context data is associated with shopping, then the rule may specify for the inventory interface 370 to return a value from the cache 335, restart the inventory database 340, and attempt to request an updated inventory value from the inventory database 340 after a specific period of time. As another example, if the request rate is below a response rate threshold, the error rate is below an error rate threshold, the response time is above a delay threshold, and the context data is associated with shopping, then the rule may specify for the inventory interface 370 to return a value from the cache 335 and attempt to request an updated inventory value from the inventory database 340 after a specific period of time.

The dynamic response manager 350 may also use the dynamic response models 325 that are configured to receive the request rate, the error rate, the response time, and the context data and output data indicating an instruction for the dynamic response manager 350 to provide to the inventory interface 370. The dynamic response models 325 may be trained using historical data and machine learning. The historical data may include multiple data samples that each include a request rate, an error rate, a response time, whether the inventory interface 370 returned the value from the cache 335, and/or the context data. The data samples may be collected from the server 300, other servers, and other computing systems that include interfaces that are capable of accessing a cached value.

The server 300 may train the dynamic response models 330 using machine learning and the historical data. The server 300 may train multiple models that are each configured to receive different types of data. For example, a group of data samples may include data indicating whether the inventory interface 370 returned the value from the cache 335 or from the inventory database 340. Those data samples may also include a request rate, an error rate, a response time, and context data. The resulting model may be configured to receive a request rate, an error rate, a response time, and context data and output data indicating whether to instruct the inventory interface 370 to return a value from the cache 335 or from the inventory database 370.

The dynamic response manager 350 may use a combination of the dynamic response models 325 and the dynamic response rules 330 to determine the instructions. In some implementations, the dynamic response manager 350 may provide the request rate, the error rate, the response time, and the context data to a model from the dynamic response models 325 and receive candidate instructions from the model. The dynamic response manager 350 may then apply the request rate, the error rate, the response time, and the context data to the dynamic response rules 330. If the rules indicate that any aspect of the candidate instructions should be changed, then the dynamic response manager 350 may update the instructions and provide them to the inventory interface 370.

Figure 4:
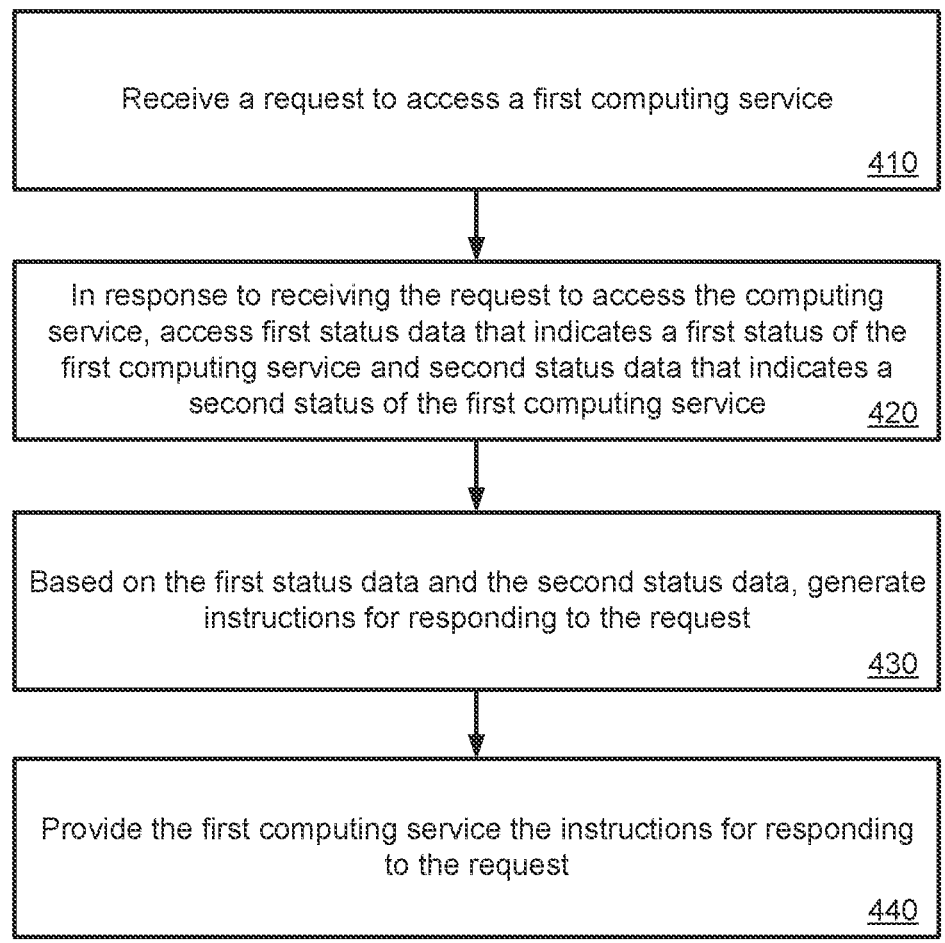
FIG. 4 is a flowchart of an example process for managing the response strategy of a computing service.

FIG. 4 is a flowchart of an example process 400 for managing the response strategy of a computing service. In general, the process 400 monitors the status of various computing services. Based on those statuses, the process 400 generates instructions for how one or more of the computing services should respond to requests. The process 400 will be described as being performed by the network server 124 and will include references to other components in FIG. 1. The process 400 may also be performed by the server 200 of FIG. 2 and/or the server 300 of FIG. 3.

The network server 124 receives a request to access a first computing service (410). This response may be in response to the user performing an action. The action may include adding an item to a shopping cart, attempting to log in to an application, and/or any other similar action. In the case of adding an item to a shopping cart, an inventory interface 128 may receive a request to access an inventory database 130. In the case of attempting to log in to an application, a user authenticator interface may receive a request to authenticate a user.

In response to receiving the request to access the computing service, the network server 124 accesses first status data that indicates a first status of the first computing service and second status data that indicates a second status of the first computing service (420). In some implementations, the first status data and the second status data may indicate a frequency at which the first computing service is receiving requests, an error frequency at which the first computing service generates an error, and/or a delay at which the first computing service outputs a response to given requests.

In some implementations, the user is performing an action. This action may cause the network server 124 to request access to the first computing service. The network server 124 may also generate context data based on the action. The context data may reflect the context of the action, any current events, actions other users, the data being exchanged between the client device 108 and the network server 124, and/or any other similar data.

Based on the first status data and the second status data, the network server 124 generates instructions for the first computing service to respond to the request (430). The network server 124 may generate the instructions based on the frequency at which the first computing service is receiving requests, the error frequency at which the first computing service generates an error, the delay at which the first computing service outputs a response to given requests, and/or the context data. The network server 124 may apply a model and/or rules to the frequency at which the first computing service is receiving requests, the error frequency at which the first computing service generates an error, the delay at which the first computing service outputs a response to given requests, and/or the context data to generate the instructions.

In some implementations, the instructions may include an instruction to return cached data, an instruction to delay a period of time before responding to the request, an instruction to restart the first computing service, and/or an instruction to not respond to the request and to transmit the request to a third computing service that is configured to generate a similar response to the request as the first computing service. In the case of transmitting the request to the third computing service, the third computing service may be one that is located in a different geographic area than the first computing service. For example, the network server 124 may be located in the northwest region, and the first computing service of the network server 124 is experiencing a spike in requests. Another network server in the southeast region includes a third computing service that is similar to the first computing service. The network server in the southeast region may not be experiencing the spike in requests. In this case, the network server 124 may instruct the first computing service to direct some requests to the third computing service to prevent the first computing service from being overloaded.

In some implementations, the cost of transmitting an instruction from the first computing service to the third computing service may be a factor in determining the instruction to provide to the first computing service. In some implementations, the network server 124 does not access the second status data. In this case, the network server 124 may generate the instructions for the first computing service based on the first status data.

In some implementations, the network server 124 may train the model using historical data and machine learning.

The model may be configured to receive the frequency at which the first computing service is receiving requests, the error frequency at which the first computing service generates an error, the delay at which the first computing service outputs a response to given requests, and/or the context data and output data indicating the instruction to provide to the first computing service.

The network server 124 provides the first computing service the instructions for responding to the request (440). In some implementations, the network server 124 may monitor the first status data of the first computing service and/or the second status data of the first computing service. The network server 124 may update the historical data used to train the model using the new first status data and/or the new second status data. The network server 124 may retrain the model using machine learning and the updated historical data. The network server 124 may use the model to generate future instructions.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   determining that a user who is interacting with a system is requesting to perform an action;
   receiving a request to access a computing service that is in response to the user requesting to perform the action;
   determining a context of the action;
   in response to receiving the request to access the computing service, accessing status data that indicates a status of the computing service;
   based on the status of the computing service, determining that an accuracy of data output by the computing service has decreased;
   determining that the context of the action affects the accuracy of the data output by the computing service;
   determining that the decreased accuracy of the data output by the computing service does not prevent the user from completing the action using the system;
   based on determining that the decreased accuracy of the data output by the computing service does not prevent the user from completing the action using the system and determining that the context of the action affects the accuracy of the data output by the computing service, generating instructions for the computing service to respond to the request by outputting data with the decreased accuracy; and
   providing the computing service the instructions for the computing service to respond to the request by outputting data with the decreased accuracy.

2. The method of claim 1, wherein the status data comprises:
   data indicating a frequency at which the computing service is receiving requests;
   data indicating an error frequency at which the computing service generates an error; and
   data indicating a delay at which the computing service outputs a response to given requests.

3. The method of claim 1, wherein generating the instructions for the computing service to respond to the request by outputting data with the decreased accuracy comprises:
   generating an instruction to return cached data;
   generating an instruction to delay a period of time before responding to the request;
   generating an instruction to restart the computing service; or
   generating an instruction to not respond to the request and transmitting the request to an additional computing service that is configured to generate a similar response to the request as the computing service.

4. The method of claim 3, wherein the computing service is located in a first geographic location and the additional computing service is located in a second, different geographic location.

5. The method of claim 1, comprising:
   accessing a model that is configured to receive given status data and output given instructions for how the computing service is to respond to a given request,
   wherein generating the instructions for the computing service to respond to the request by outputting data with the decreased accuracy comprises:
      providing the status data as an input to the model; and
      receiving, from the model, the instructions for the computing service to respond to the request.

6. The method of claim 5, comprising:
   after receiving the instructions for the computing service to respond to the request, receiving updated status data; and
   updating, using machine learning, the model based on the updated status data and the instructions for the computing service to respond to the request.

7. The method of claim 1, wherein generating the instructions for the computing service to respond to the request comprises applying a rule to the status data.

8. A system, comprising:
   one or more processors; and
   memory including a plurality of computer-executable components that are executable by the one or more processors to perform a plurality of actions, the plurality of actions comprising:
      determining that a user who is interacting with a system is requesting to perform an action;
      receiving a request to access a computing service that is in response to the user requesting to perform the action;
      determining a context of the action;
      in response to receiving the request to access the computing service, accessing status data that indicates a status of the computing service;
      based on the status of the computing service, determining that an accuracy of data output by the computing service has decreased;
      determining that the context of the action affects the accuracy of the data output by the computing service;
      determining that the decreased accuracy of the data output by the computing service does not prevent the user from completing the action using the system;
      based on determining that the decreased accuracy of the data output by the computing service does not prevent the user from completing the action using the system and determining that the context of the action affects the accuracy of the data output by the computing service, generating instructions for the computing service to respond to the request by outputting data with the decreased accuracy; and providing the computing service the instructions for the computing service to respond to the request by outputting data with the decreased accuracy.

9. The system of claim 8, wherein the status data comprises:
data indicating a frequency at which the computing service is receiving requests;
data indicating an error frequency at which the computing service generates an error; and
data indicating a delay at which the computing service outputs a response to given requests.

10. The system of claim 8, wherein generating the instructions for the computing service to respond to the request by outputting data with the decreased accuracy comprises:
generating an instruction to return cached data;
generating an instruction to delay a period of time before responding to the request;
generating an instruction to restart the computing service; or
generating an instruction to not respond to the request and transmitting the request to an additional computing service that is configured to generate a similar response to the request as the computing service.

11. The system of claim 10, wherein the computing service is located in a first geographic location and the additional computing service is located in a second, different geographic location.

12. The system of claim 8, wherein the actions comprise:
accessing a model that is configured to receive given status data and output given instructions for how the computing service is to respond to a given request,
wherein generating the instructions for the computing service to respond to the request by outputting data with the decreased accuracy comprises:
providing the status data as an input to the model; and
receiving, from the model, the instructions for the computing service to respond to the request.

13. The system of claim 12, wherein the actions comprise:
after receiving the instructions for the computing service to respond to the request, receiving updated status data; and
updating, using machine learning, the model based on the updated status data and the instructions for the computing service to respond to the request.

14. The system of claim 8, wherein generating the instructions for the computing service to respond to the request comprises applying a rule to the status data.

15. One or more non-transitory computer-readable media of a computing device storing computer-executable instructions that upon execution cause one or more processors to perform acts comprising:
determining that a user who is interacting with a system is requesting to perform an action;
receiving a request to access a computing service that is in response to the user requesting to perform the action;
determining a context of the action;
in response to receiving the request to access the computing service, accessing status data that indicates a status of the computing service;
based on the status of the computing service, determining that an accuracy of data output by the computing service has decreased;
determining that the context of the action affects the accuracy of the data output by the computing service;
determining that the decreased accuracy of the data output by the computing service does not prevent the user from completing the action using the system;
based on determining that the decreased accuracy of the data output by the computing service does not prevent the user from completing the action using the system and determining that the context of the action affects the accuracy of the data output by the computing service, generating instructions for the computing service to respond to the request by outputting data with the decreased accuracy; and
providing the computing service the instructions for the computing service to respond to the request by outputting data with the decreased accuracy.

16. The medium of claim 15, wherein the status data comprises:
data indicating a frequency at which the computing service is receiving requests;
data indicating an error frequency at which the computing service generates an error; and
data indicating a delay at which the computing service outputs a response to given requests.

17. The medium of claim 15, wherein generating the instructions for the computing service to respond to the request by outputting data with the decreased accuracy comprises:
generating an instruction to return cached data;
generating an instruction to delay a period of time before responding to the request;
generating an instruction to restart the computing service; or
generating an instruction to not respond to the request and transmitting the request to an additional computing service that is configured to generate a similar response to the request as the computing service.

18. The medium of claim 15, wherein the acts comprise:
accessing a model that is configured to receive given status data and output given instructions for how the computing service is to respond to a given request,
wherein generating the instructions for the computing service to respond to the request by outputting data with the decreased accuracy comprises:
providing the status data as an input to the model; and
receiving, from the model, the instructions for the computing service to respond to the request.

19. The medium of claim 18, wherein the acts comprise:
after receiving the instructions for the computing service to respond to the request, receiving updated status data; and
updating, using machine learning, the model based on the updated status data and the instructions for the computing service to respond to the request.

20. The medium of claim 15, wherein generating the instructions for the computing service to respond to the request comprises applying a rule to the status data.

* * * * *